March 23, 1965 C. E. GOLDEN ETAL 3,174,923
MERCURY CATHODE ELECTROLYTIC CELL
Filed June 14, 1961
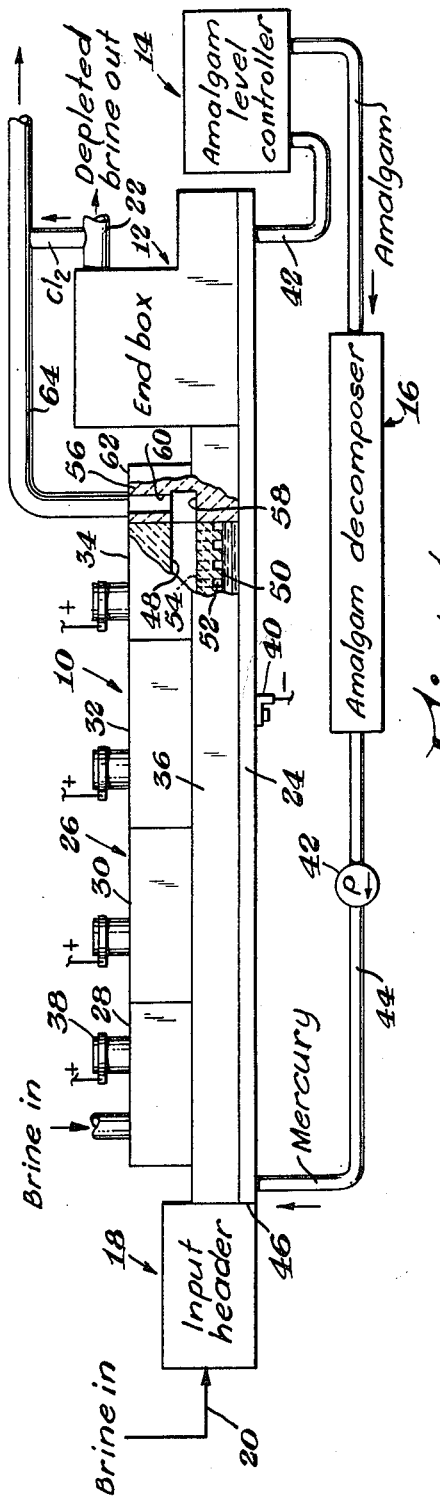
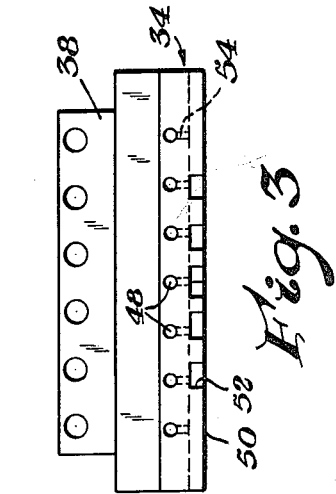
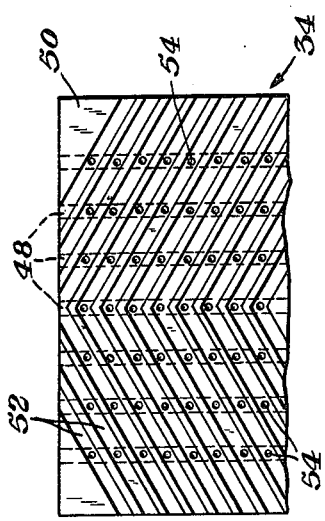
INVENTORS.
Charles E. Golden
William H. Caines
Jerome C. Cates, Jr.
John C. Myers, Jr.
Eugene R. Ketchum
BY Earl D. Ayers
AGENT

United States Patent Office

3,174,923
Patented Mar. 23, 1965

3,174,923
MERCURY CATHODE ELECTROLYTIC CELL
Charles E. Golden, William H. Caines, Jerome C. Cates, Jr., and John C. Meyers, Jr., Lake Jackson, and Eugene R. Ketchum, Freeport, Tex., assignors to The Dow Chemical Company, Midland, Mich., a corporation of Delaware
Filed June 14, 1961, Ser. No. 127,773
9 Claims. (Cl. 204—220)

This invention relates to mercury-cathode electrolytic brine cells, and particularly to slot-type mercury-cathode cells.

A typical mercury-cathode electrolytic cell for making chlorine and alkali comprises a long, narrow trough with a mercury pool cathode at the bottom and graphite anodes suspended from or supported by a rubber-lined cover. The feed brine is flowed through the cell with very low turbulence. The chlorine ions in the brine are attracted ot the anode and thus discharged to form chlorine gas which is usually withdrawn through an outlet line which leads from the rubber lined cover. The cation, usually sodium, forms an amalgam with the mercury which is removed from the cell and treated with water in a separate denuder to form an alkali, caustic soda, for example, the mercury being thus regenerated for re-use as the flowing cathode material.

Caustic soda made by means of mercury-cathode cells is of higher concentration and purity than caustic soda made with diaphragm type cells, but the cost of producing this caustic has heretofore been higher at most installations as compared to the cost of caustic made with diaphragm cells.

Several factors contribute to the high cost of producing caustic soda by means of mercury-cathode cells. One important factor is the high initial cost of mercury-cathode cells as compared with the cost of diaphragm type electrolytic cells. Another factor is that conventional mercury-cathode cells of the above described type operate at relatively low current densities in order to avoid excessive polarization of electrodes and thus occupy considerable building space per unit for chlorine or caustic producing capacity.

Mercury-cathode cells of conventional design have also proven to be quite sensitive to impurities in the brine, thus necessitating that expensive brine treatment facilities be provided in order to remove bothersome impurities. Also, the amount of mercury required for the cathode has been large, and since some of the mercury is lost during the operation of the cell, the amount of mercury used has added to both the initial investment and the cost of operation of such cells.

An attempt to overcome some of these difficulties has resulted in what is known as a slot-type mercury cathode cell. Canadian Patent No. 476,519 to Heller and Saunders illustrates and claims a slot-type cell. In slot-type mercury cathode electrolytic cells the mercury cathode usually comprises a thin layer or film of mercury which is swept through the cell at a high velocity as compared to the rate of flow of the cathode material in a conventional cell as previously described. Also, in many slot-type cells, the chlorine is removed from the cell through the fluid flow channel and does not bubble upward through apertures in the anode. In general, slot-type mercury cathode cells are capable of operation at considerably higher current densities than are conventional mercury cathode cells.

However, it has been found that when the chlorine is swept along the lower surface of the anode for appreciable distances before being removed from that surface that the chlorine bubbles in the brine stream form a substantial part of the electrical resistance across the electrodes of the cell. The problem hasc been alleviated to some extent by placing rubber lined vent boxes between anode segments every two to four feet along the cell. Such means are expensive and result in anodes which still are longer than are desirable if the amount of chlorine bubbles in the cell electrolyte lying between the anode and cathode is to be held to small amounts which permit operation of the cell at high current densities.

Accordingly, a principal object of this invention is to provide an improved anode assembly for use in liquid cathode electrolytic cells.

Another object of this invention is to provide an improved anode assembly which is capable of efficient operation at high current densities in liquid cathode type electrolytic cells.

A further object of this invention is to provide an improved self-venting anode assembly for use in a liquid cathode type electrolytic cell.

An additional object of this invention is to provide a liquid cathode type electrolytic cell which is capable of high production of halogen gas per unit area of anode surface, operates at high current densities at relatively low voltages and is relatively simple to construct and maintain.

The above and additional objects and advantages of this invention will best be understood when the following detailed description is read in connection with the accompanying drawings, in which:

FIG. 1 is a simplified side elevational and diagrammatical view of an improved electrolytic cell assembly made in accordance with this invention;

FIG. 2 is a fragmentary plan view of the lower surface of the anode of the cell shown in FIG. 1, and FIG. 3 is an end elevational view of the downstream end of the anode shown in FIG. 1.

Referring to the drawings, and particularly to FIG. 1, there is shown a flowing cathode electrolytic cell, indicated generally by the numeral 10, end box 12, analgam level controller 14, amalgam decomposer 16, and brine input header 18, brine input line 20, and brine output line 22.

The cell 10 comprises a cathode base plate 24 which extends beyond the cell to also serve as the base of the end box 12, a composite anode assembly, indicated generally by the numeral 26, composed of anode segments 28, 30, 32, 34 joined together to form a unitary structure, and a separator-gasket structure 36 which maintains the anode spaced and insulated from the cathode base plate and also maintains a liquid and gas tight seal between the anode, cathode and the surrounding atmosphere.

In operation current is applied across the cell with positive electrode terminals 38 on the anode 26 being connected to a positive lead of a direct current potential source (not shown) and a negative terminal 40 coupled to the cathode base plate being electrically coupled to the negative lead of the previously mentioned potential source.

Mercury is pumped by means of the pump 42 and line 44 to the input end 46 of the cell 10 and then flows along and covers the top surface of the base plate, as is well known, forming the flowing cathode of the cell. Brine, entering the cell through the input line 20, is fed into the cell, filling the space between the flowing cathode and the anode 26. The brine and flowing cathode flow into the end box 12 where the brine (and chlorine entrapped therein) is withdrawn. The amalgam flows out of the end box through the trap 42, through the amalgam level controller which maintains the level of the amalgam to provide the desired thickness of the flowing cathode in the cell, and into the amalgam decomposer 16. In the decomposer 16 the sodium is released from the amalgam and the mercury then is pumped again into the cell.

Referring now to FIGS. 2 and 3, as well as to FIG. 1, the anode 26 is mainly composed, as stated previously, of four rectangular block-like segments 28, 30, 32, 34 bonded together by a suitable adhesive material such as phenolformaldehyde to form a unitary structure. A plurality of longitudinally extending parallel bores 48 extend from the downstream end of the segment 34 to or near to the upstream end of the segment 28. The bores 48 are disposed about half-way between the top and bottom of the anode and spaced apart at least a few inches. The bores 48 are usually, although not necessarily, symmetrically disposed across the width of the anode.

The surface 50 of the anode 26 which faces the base plate 24 has an array of slots 52 disposed therein. The slots 52 extend transversely across the surface 50 and may vary in form from straight slots which are perpendicular to the longitudinal axis of the anode to slots 52 having a chevron-like configuration as shown in FIG. 2.

An array of bores 54 provides communication between the slots 52 and the bores 48. Usually, but not necessarily, one of the bores 54 extends through the base of each slot 52 at the point where the base passes over one of the longitudinally extending bores 48. A supplemental block-like anode segment 56 is secured in a substantially gas tight manner to the downstream end of the anode segment 34, the bottom surface of the segment 56 being in substantially the same plane as is the bottom surface of the anode segments 28, 30, 32 and 34.

The anode segment 56 has a slot 58 extending inwardly from the surface thereof which is adjacent to the downstream end of the anode segment 34. The slot 58 is so disposed between the top and bottom of the segment 56 that it is aligned with the output ends of the longitudinally extending bores 48. A bore 60 extends from the upper surface 62 of the segment 56 to the slot 58. A suitable chlorine output header 64 is coupled to the upper end of the bore 60 and to the end box 12 through the brine outlet means 22.

In operation, as chlorine bubbles from the brine are discharged on the bottom surface of the anode 26 they are swept along by the flowing brine until they reach one of the slots 52. The gas, or at least a major part of it, then enters the slot, passes through one of the bores 54 and passes into one of the longitudinally extending bores 48. The gas in the bores 48 passes into the slot 58 and is withdrawn from the anode through the bore 60 and enters the chlorine output header 64.

Because the chlorine is swept away at frequent intervals from the lower surface of the anode, resistance across the cell is lowered and a significant savings in power is achieved in operating the cell. Another significant advantage of anode structures made in accordance with this invention is that the anodes may be operated for extended periods of time without adjusting the anode-cathode spacing because of the slow and uniform rate of erosion of the bottom surface of the anode.

In one anode made in accordance with this invention the anode is about 40 inches wide, 43 inches long and 8 inches thick (not including the electrode connector elements 38). The slots are 3/16 inch wide, 2 inches deep and extend inwardly from the sides at a 60 degree angle. The slots extending inward from opposite sides are arranged to meet at the center of the bottom of the anode, the apex of the chevron-like array pointing either towards the downstream or upstream end of the anode.

The longitudinally extending bores are 7/8 inch in diameter and are placed approximately 4½ inches on centers. The bores 54 are 1/8 inch in diameter and extend from the base of the slots 52 into one of the bores 48.

The slots 52 are 2 inches on centers at the edge of the anode.

While anodes having the chevron-like array of slots are preferred in some instances, anodes in which the transversely extending slots 52 are generally perpendicular to the direction of flow of the brine and flowing cathode have also been used successfully.

Other spacings between both the adjacent slots 52 (up to 6 inches, for example) and adjacent longitudinally extending bores 48 (up to 9 inches, for example) have been used. The number of slots, their spacing from each other, the length and width of the anode, number, size and spacing of the longitudinally extending bores 48, etc. may be determined by trial or by calculations taking into consideration the conditions under which the cell will be operating.

Also, anodes made in accordance with this invention are adapted for use in electrolytic cells other than the flowing cathode type but where a similar gas removal problem exists.

Alternatively, the output header 64 may be simply a means for coupling the bores 48 to the end box or to other suitable withdrawal means.

What is claimed is:

1. A flowing cathode electrolytic cell having an input end and an output end and including a combination cell cover-anode, a cathode, means for maintaining said cell cover-anode and cathode in predetermined spaced apart relationship, means for feeding electrolyte into the input end of said cell, means for removing electrolyte from the output end of said cell, said cathode having a generally planar surface facing said anode, said cell cover-anode comprising a unitary block-like graphite structure, said structure having a top side which is substantially impervious to cell fluids, bottom side, upstream end, downstream end and sides extending between the ends, said cell cover-anode having an array of transversely extending slots completely across its bottom side, an array of longitudinally extending bores, said longitudinally extending bores being disposed between said top side and bottom side and extending from said downstream end to at least near to the upstream end, an array of bores connecting each of said slots with at least one of said longitudinally extending bores, and output header means coupled to said longitudinally extending bores only at the downstream end of said cell cover-anode.

2. An electrolytic cell in accordance with claim 1, wherein said slots extending across the bottom side are in the form of a chevron-like shaped array extending inwardly from sides extending between the ends.

3. An electrolytic cell in accordance with claim 1, wherein said longitudinally extending bores are disposed generally parallel with respect to the direction of flow of electrolyte through said cell.

4. An electrolytic cell in accordance with claim 1, wherein said cell is of the flowing cathode type.

5. An electrolytic cell in accordance with claim 1, wherein said slots are spaced apart approximately two inches on center.

6. An electrolytic cell in accordance with claim 1, wherein the spacing between adjacent slots is several times the width of the slots.

7. An electrolytic cell in accordance with claim 1, wherein said slots are of substantially uniform width.

8. An electrolytic cell in accordance with claim 1, wherein said output header comprises a short block-like extension of said cell cover-anode structure, said extension abutting against said downstream end of the cell cover-anode and having a laterally extending slot communicating with the longitudinally extending bores and a bore extending from said slot to an external surface of the block-like extension.

9. An electrolytic cell in accordance with claim 1, wherein said slots extend from said sides towards said downstream end at an angle approximating 60 degrees.

References Cited in the file of this patent

UNITED STATES PATENTS

| | | |
|---|---|---|
| 908,545 | Carrier | Jan. 5, 1909 |
| 2,428,584 | Richardson | Oct. 7, 1947 |
| 2,631,126 | Horst | Mar. 10, 1953 |
| 2,786,810 | Brown | Mar. 26, 1957 |
| 2,917,441 | Donald | Dec. 15, 1959 |
| 2,974,098 | Oliver | Mar. 7, 1961 |
| 3,062,733 | Lynn et al. | Nov. 6, 1962 |

FOREIGN PATENTS

| | | |
|---|---|---|
| 316,694 | Great Britain | Aug. 8, 1929 |
| 708,023 | Great Britain | Apr. 28, 1954 |